Patented June 7, 1932

1,862,167

UNITED STATES PATENT OFFICE

OTTO STINER, OF BERNE, SWITZERLAND, ASSIGNOR TO HERRN DR. STINER & LIGNAT-WERKE A. G., GRANDSON, OF BERNE, SWITZERLAND, A CORPORATION OF SWITZERLAND

METHOD OF SILICIFYING FIBROUS MATERIALS

No Drawing. Application filed July 29, 1930, Serial No. 471,605, and in Switzerland August 6, 1929.

This invention relates to an improved method of silicifying fibrous materials.

Careful investigation into known methods of silicifying fibrous material for the manufacture of building elements shows that the silicification produced heretofore is very defective. The reason of this is that only a small part of the small quantities of silicic acid admixed with the raw fibrous materials in the form of water glass separates out on the surface of the fibrous substance, whilst the greater part thereof runs away with the water and scarcely penetrates into the interior of the fibers.

According to the present invention there is provided a method of silicifying fibrous materials in which the fibers of the material to be silicified are preliminarily treated to open them to enable the silicic acid to penetrate into and through them, after which operation the silicic acid is precipitated in and on the fibers.

Bacteriological tests have shown that suitable bacteria, e. g. those of the lactic acid group, in a suitable nutrient medium, e. g. whey and at a suitable temperature, such as 30–40° C., when brought together with fibrous materials of animal or vegetable origin exert on these substances an action which is exceedingly favorable for preparing thorough silicification. The nutritive liquid penetrates with the bacteria into the fibrous texture and the bacteria propagate themselves there whilst separating small quantities of acid, such as lactic acid and acetic acid. This acid serves the purpose of checking the development of other microorganisms, e. g. putrescent bacteria, contained in the texture, and hold the field for the introduced acid-formers. As soon as these bacteria enter the tissue they will attack and use as food suitable substances of the tissue, such as sugar and the like, because the nutritive liquid introduced with them no longer suffices their greatly increased number. As products of their assimilation acids are again formed which in this way are deposited in all parts of the fibrous material owing to the penetration of the bacteria. After a predetermined time, e. g. 4–6 hours, the bacteriological process is stopped, for example by heating for a short time to 85–100° or for a longer time to 63–65° C.

A suitable quantity of water glass is then added to the material thus completely penetrated by acid. In consequence of the loosening of the tissue by the bacteria the water glass can now enter the entire fiber and is there precipitated by the previously deposited acid. In this manner there is produced in the fiber a silicic acid structure which is much more extensive than the external silicic acid coating produced by previous methods. The invention thus provides complete silicification which meets the highest requirements of the art.

I claim:—

1. In the method of silicifying fibrous materials the steps of treating the fibrous material with acid-forming bacteria and the acids produced by the same, arresting the growth of bacteria by heat. and saturating the fibrous material with water glass.

2. A method of silicifying fibrous materials comprising the steps of placing the fibers in a nutritive medium for acid-forming bacteria, whereby the fibers are loosened and penetrated by bacteria which excrete acid, arresting the growth of bacteria in the fibers by heat, and impregnating the loosened fibers with water glass.

3. A method of silicifying fibrous materials comprising the steps of placing the fibers in whey and thereby loosening them and causing them to be penetrated by acid-forming bacteria, arresting the growth of the bacteria in the fibers by heat, and impregnating the loosened acid-containing fibers with water glass.

Signed at Berne, this 16th day of July, 1930.

DR. OTTO STINER.